United States Patent [19]

Birk

[11] Patent Number: 4,618,887
[45] Date of Patent: Oct. 21, 1986

[54] METHOD AND APPARATUS FOR REPRESENTING ULTRASONIC ECHO SIGNALS ARRIVING IN POLAR COORDINATES

[75] Inventor: Adalbert Birk, Erlangen, Fed. Rep. of Germany

[73] Assignee: Siemens Aktiengesellschaft, Berlin & Munich, Fed. Rep. of Germany

[21] Appl. No.: 589,656

[22] Filed: Mar. 14, 1984

[30] Foreign Application Priority Data

Mar. 14, 1983 [DE] Fed. Rep. of Germany ....... 3308995

[51] Int. Cl.$^4$ .......................... H04N 7/01; H04N 7/18
[52] U.S. Cl. ..................................... 358/112; 73/620; 128/660; 358/140
[58] Field of Search ................ 358/112, 140; 128/660; 73/602, 620, 621

[56] References Cited

U.S. PATENT DOCUMENTS

| | | | |
|---|---|---|---|
| 4,214,269 | 7/1980 | Parker | 358/140 |
| 4,245,250 | 1/1981 | Tiemann | 358/140 |
| 4,310,907 | 1/1982 | Tachita | 358/140 |
| 4,317,370 | 3/1982 | Glenn | 73/620 |
| 4,408,228 | 10/1983 | Mahony | 128/660 |
| 4,412,249 | 10/1983 | Carmen | 358/112 |

*Primary Examiner*—Howard W. Britton
*Attorney, Agent, or Firm*—Hill, Van Santen, Steadman & Simpson

[57] ABSTRACT

A method and apparatus for representing ultrasonic echo signals arriving in polar coordinates which are obtained by means of a sector scan technique and which are intermediately stored for the purpose of subsequent display conforming to television standards alternately supply the echo signals to one of at least two complete image memories having respective two-dimensional matrix memory formats. The image memories operate an alternating buffer memories and eliminate the need for conventionally employed vector memories and horizontal memories while nonetheless permitting complete representation of the ultrasonic scans in the form of television images.

9 Claims, 7 Drawing Figures

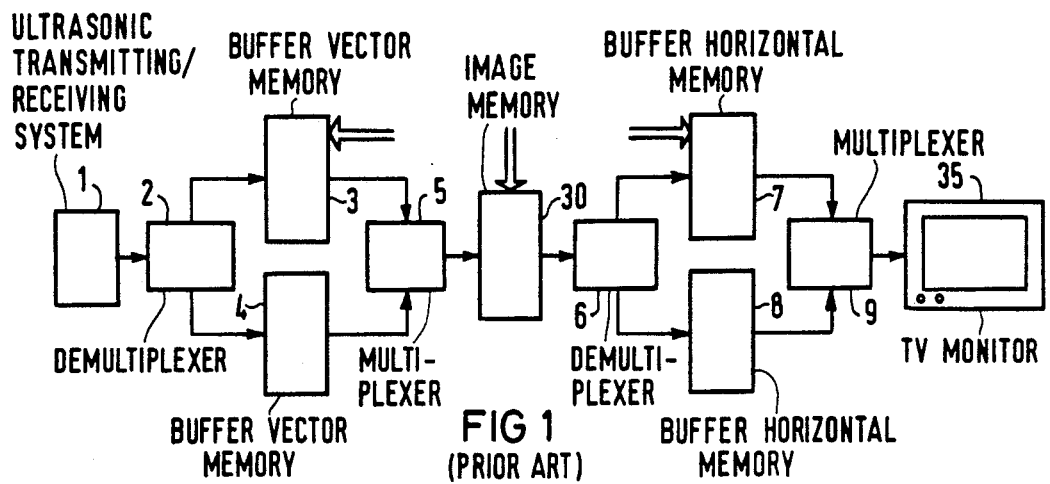
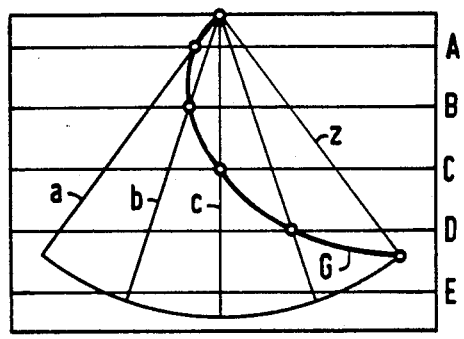
FIG 2
(PRIOR ART)
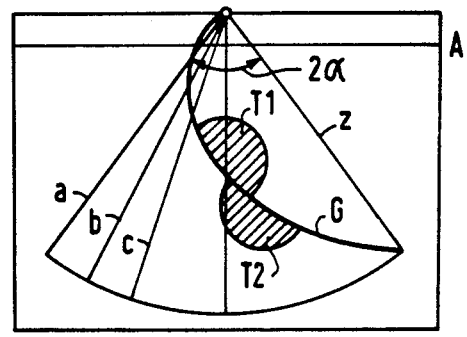
FIG 3
(PRIOR ART)
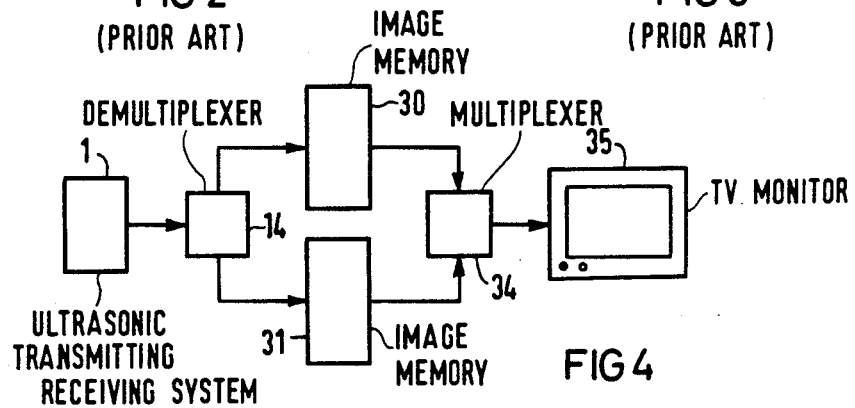
FIG 4

METHOD AND APPARATUS FOR REPRESENTING ULTRASONIC ECHO SIGNALS ARRIVING IN POLAR COORDINATES

BACKGROUND OF THE INVENTION

1. Field of the Invention

The present invention relates to a method and apparatus for representing ultrasonic echo signals arriving in polar coordinates obtained by means of a sector scan technique, and in particular to such a method and apparatus wherein the echo signals are intermediately stored in a two-dimensional image memory and are read out therefrom for the purpose of representation on a monitor conforming to television standards, wherein the two-dimensional image memory contains a memory matrix for accommodating a complete ultrasonic echo image.

2. Description of the Prior Art

In conventional ultrasonic sector scan procedures, it is desirable to display the image information, produced in the form of vectors, as a homogeneous image on the display screen of a television monitor. As used herein the term "vector" means the echo information received along an ultrasonic line after emission of an ultrasonic pulse. For various scan times, in the sector scan technique, various angular directions proceeding from a common point of origin for the respective vectors result. Thus for a real time display conforming to television standards for the purpose of ultrasonic technology, it is necessary to employ a scan converter with an intermediate memory. A scan converter converts the ultrasonic scan into a display signal conforming to television standards which can be represented on the monitor.

In order to represent ultrasonic sectional images according to television standards, it is thus necessary to intermediately store the generated images in one or more intermediate memories prior to representation on the television monitor. Generally a single two-dimensional image memory in conjunction with a one-dimensional vector memory or vertical memory are employed, as well as a one-directional horizontal memory or television line memory connected after the image memory in the direction of information flow. The vector memory and the horizontal memory are generally each operated according to the alternation buffer procedure.

For such a memory procedure, which employs a two-dimensional image memory having a matrix equipped to accept a complete ultrasonic echo image, a disadvantage is that the video image displayed on the monitor results from at least two chronologically successively disposed ultrasonic scans. This means that movements of the examined subject are detected at different times and therefore the subject, or parts thereof, according to their movement, may be represented at a different location on the display screen. For example, the human heart or other organs in the medical field may move back and forth on the display screen as a result. A further disadvantage is that the sickle-shaped dividing line which separates the new image from the preceeding image is normally not perceived on the display screen. Erroneous interpretation may thus occur in the assessment or evaluation of a moved process or a subject which is given to movement. This is a considerable disadvantage, particularly in the medical field.

The above-described memory operations are customarily carried out utilizing digital semiconductor memories. A scan converter for an ultrasonic sector scanner is described, for example, in U.S. Pat. No. 4,245,250 having the objective of attaining as high a frame repetition rate (or frame frequency) as possible. The scan lines generated by the sector scanner (phased array) are scanned with varying frequency. The ultrasonic echo signals or scan data thus acquired along a scan line are written into one of four main memories. Pre-connected time delay devices serve as intermediate memories. Each of the main memories, which are two-dimensional memories, is equipped to accept one fourth of the ultrasonic image. Through application of the variable frequency during the scanning, a data reduction is effective during entry of the information into the main memories.

SUMMARY OF THE INVENTION

It is an object of the present invention to provide a method and apparatus for representing in real-time ultrasonic echo signals arriving in polar coordinates such that the result of coarse movement of the scanned object is largely suppressed within the representation.

The above object is inventively achieved in a method and apparatus employing at least one additional two-dimensional image memory with a second matrix memory for accepting a complete ultrasonic echo image, the ultrasonic echo signals being alternately supplied to one of the two-dimensional image memories such that a complete ultrasonic echo image is respectively inscribed in the respective image memory and simultaneously from the other image memory the ultrasonic echo signals of the preceding complete ultrasonic echo image stored therein are read out onto the monitor in a manner conforming to television standards.

An apparatus for undertaking the method disclosed and claimed herein has an ultrasonic transmitting and receiving system for undertaking the sector scanning, with an image memory having a matrix memory equipped for accommodating a complete ultrasonic echo image for intermediate storage of the arriving ultrasonic echo signals, and a monitor for representing the stored ultrasonic echo signals in an ultrasonic echo image. The apparatus has at least one additional two-dimensional image memory associated with the first image memory, the additional image memory having a second matrix memory for also accepting a complete ultrasonic echo image. The ultrasonic transmitting and receiving system supplies a signal to an analog-to-digital converter whose output signal is alternately supplied for the duration of a complete ultrasonic echo image by means of a multiplexer to one of the image memories. A multiplexer is also connected after the image memories in a direction of information flow which for the duration of the representation of an ultrasonic image on the monitor alternately supplies the complete echo image signals contained in the image memories to the monitor through a digital-to-analog converter. Address control units each having one demultiplexer associated therewith are provided for entry (right-in) and readout of the ultrasonic echo signals in the image memories or out of the image memories.

Although the method and apparatus disclosed and claimed herein require at least two two-dimensional rapid image memories, a substantial simplification of the imaging process is achieved, as well as simplification of the apparatus, particularly with regard to the control circuitry necessary. Moreover, because it is possible to represent complete ultrasonic sector scans in the television image, the sickle-shaped separation of the image into partial images which had been acquired at various times is avoided. Consequently the disturbing movement or "image artifacts" is also eliminated.

Utilization of a third complete two-dimensional image memory permits the possibility of independent image processing. Operation of the method and apparatus disclosed and claimed herein with three image memories is undertaken in a cyclically interchangeable fashion such that one image memory is inscribed while another is read out and simultaneously the contents of the third image memory are utilized for image processing. The modified echo image obtained by image processing can thus be again transmitted to the third image memory. As required, more than three image memories may be utilized. One of these additional image memories may be utilized as a means for storing a complete ultrasonic image over a longer time for comparison purposes.

The use of a method and apparatus as disclosed and claimed herein which requires a number of image memories is reasonable with a justifiable outlay because currently available memory modules of sufficiently high speed and capacity are available at acceptable prices for use as such memories. By utilization of such memory modules, which are available in a high integrated form, the conventional one-dimensional vector memories and horizontal memories, as well as the control units necessary for those units, are completely eliminated.

The method disclosed and claimed herein may also be employed for ultrasonic scanning installations which employ the parallel scan technique. The use of the method disclosed and claimed herein in such an installation is preferable wherein the installation is also equipped for undertaking sector scanning.

BRIEF DESCRIPTION OF THE DRAWINGS

FIG. 1 is a schematic circuit diagram of a typical conventional apparatus for representing ultrasonic echo signals arriving in polar coordinates.

FIG. 2 shows the representation of an ultrasonic echo image obtained in the conventional system shown in FIG. 1 consisting of two partial images acquired at different times.

FIG. 3 is a representation of the resulting ultrasonic echo image obtained with the system of FIG. 1 showing a movement artifact on the display screen.

FIG. 4 is a block circuit diagram of an apparatus for representing ultrasonic echo signals arriving in polar coordinates constructed in accordance with the principles of the present invention.

DESCRIPTION OF THE PREFERRED EMBODIMENTS

Figure 5:
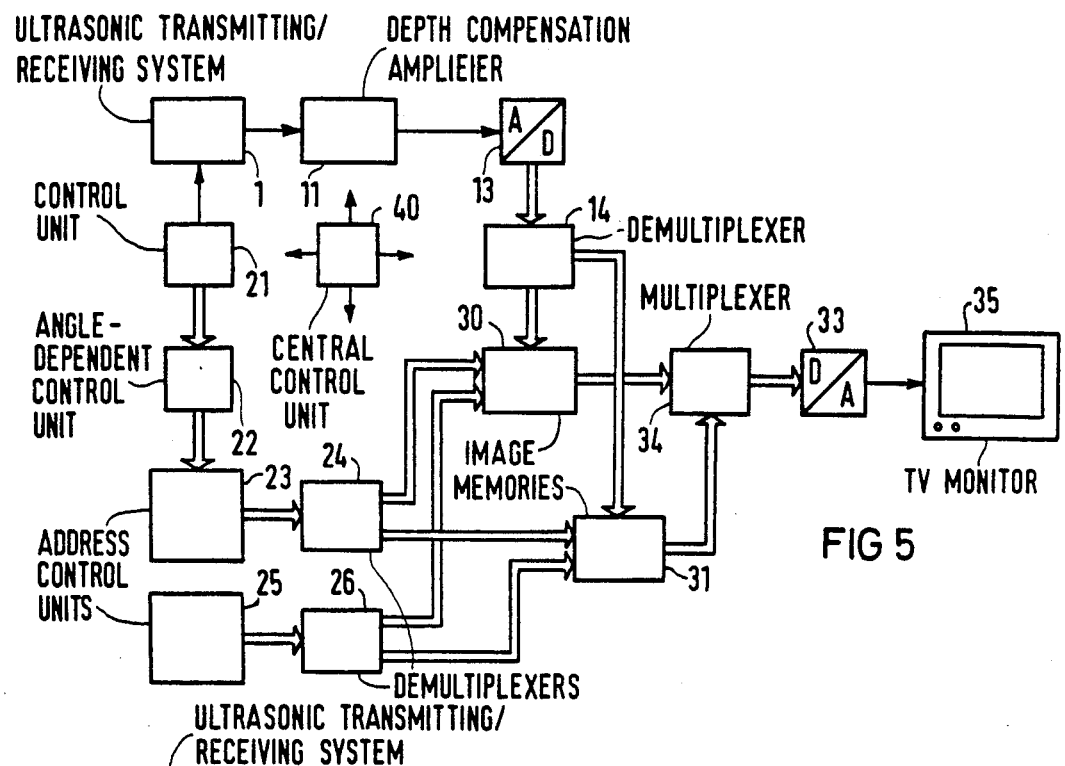
FIG. 5 is a block circuit diagram for a first embodiment of a scan converter operating in accordance with the principles of the method disclosed and claimed herein.

An apparatus operating according to conventional methods for representing in real-time ultrasonic echo signals arriving in polar coordinates obtained by means of a sector scan technique is shown in FIG. 1. It is assumed that the ultrasonic echo signals have been supplied in a known fashion by an ultrasonic transmitting and receiving system 1. The ultrasonic echo signals are supplied through a first demultiplexer 2 which, operating according to the known alternating buffer procedure, alternately transmits the echo signals to one of two buffer vector memories 3 and 4. These alternating buffer vector memories 3 and 4 are one-dimensional. Each alternating buffer vector memory 3 and 4 is thus capable only of receiving echo information from a single scan line. The echo information of such a scan line is here designated as a vector. In the case of sector scan procedure, the individual scan lines differ by specified angular increments. The output signals of the two alternating buffer vector memories 3 and 4 are alternately supplied to an image memory 30 through a first multiplexor 5. The image memory 30 is a two-dimensional memory dimensioned for accepting a complete ultrasonic echo image. The contents of the image memory 30 are alternately read out through a second demultiplexer 6 to one of two alternating buffer horizontal memories 7 and 8. These alternating buffer horizontal memories 7 and 8 are also one-dimensional. The contents of each of the alternating buffer horizontal memories 7 and 8 correspond to one television line. The contents of the two alternating buffer horizontal memories 7 and 8 are transmitted in alternating buffer operation through a second multiplexer 9 to a monitor 35 of a display apparatus. The monitor 35 generates a television image which is standardized, for example, with 625 lines and 50 traces per second. Upon readout, the contents of the alternating buffer horizontal memories 7 and 8 is assembled with a (non-illustrated) synchronous signal into a display signal conforming to television standards.

The system elements 1 through 9 and the image memory 30 are activated by a non-illustrated control installation, this being indicated with respect to the memories 3, 4, 7, 8 and 30 by address controls in the form of open arrows.

The echo image arising from the conventional system shown in FIG. 1 on the viewing screen of the monitor 35 is shown for a few scan lines in FIGS. 2 and 3. It is assumed that a circular subject is being examined which moved from top to bottom such as, for example, the human heart during its activity. The individual scan lines are referenced at a, b, c . . . z. Entry of the information proceeds along these individual lines a . . . z. The data acquisition at each of the lines a . . . z is the same so that a sector-shaped scanning results. The data acquisition time is the time during which one of the two alternating buffer vector memories 3 or 4 must be available for information entry. The reading out process proceeds along the lines of the image memory 30. Such readout lines are referenced in FIG. 2 at A, B, C, D and E. The readout lines are respectively alternately transmitted to one of the two horizontal memories 7 or 8.

In FIGS. 2 and 3, the line referenced at G identifies a sickle-shaped boundary line which, although it is generally not visible on the viewing screen of the monitor 35, separates a preceeding echo image (located at the right side of the screen) from the echo image acquired immediately thereafter (located at the left side of the screen). This boundary line G occurs as a result of the selected quasi-orthogonal memory procedure. As is apparent from FIG. 3, this boundary line G causes the circular subject, due to its movement, to be represented in two image portions T1 and T2, that is, an "older" image portion T1 and a more recent image portion T2. This movement artifact occurs because the older and more recent partial images T1 and T2 of the circular subject were acquired at different times.

In the case of this quasi-orthogonal memory procedure, it is assumed that always a complete line a . . . z is stored and thereafter a line A . . . E is read out. It is also possible for a partial section of a line a . . . z to be alternately entered and a partial section of a line A . . . E (or an entire line A . . . E) to be alternately read out. In the illustrated example of FIGS. 2 and 3, the stand proceeds from left to right. Thus, for example, in the line B from the left edge to the intersection point with the vector b, new image information is already represented whereas, from this intersection point to the right edge of the line B, old image information is still represented. The image disposed at the right has, of course, not yet been detected by the ultrasonic scan.

An apparatus employing the inventive method for avoiding movement artifacts of the type described above is schematically illustrated in FIG. 4. According to the principles of the present invention, the ultrasonic transmitting and receiving system 1 is connected to a demultiplexer 14. The demultiplexer 14 transmits the obtained ultrasonic echo signals in alternating fashion to one of two complete two-dimensional image memories 30 and 31. The image memories 30 and 31 each operate according to the alternating buffer principle. This means that the echo signals are alternately supplied to the two image memories 30 and 31 in such a fashion that a complete ultrasonic echo image is respectively written into each image memory, and a previously inscribed complete ultrasonic echo image is simultaneously read out from the other image memory through a multiplexer 34 for display on the monitor 35. The readout proceeds in a manner conforming to television standards.

Figure 6:
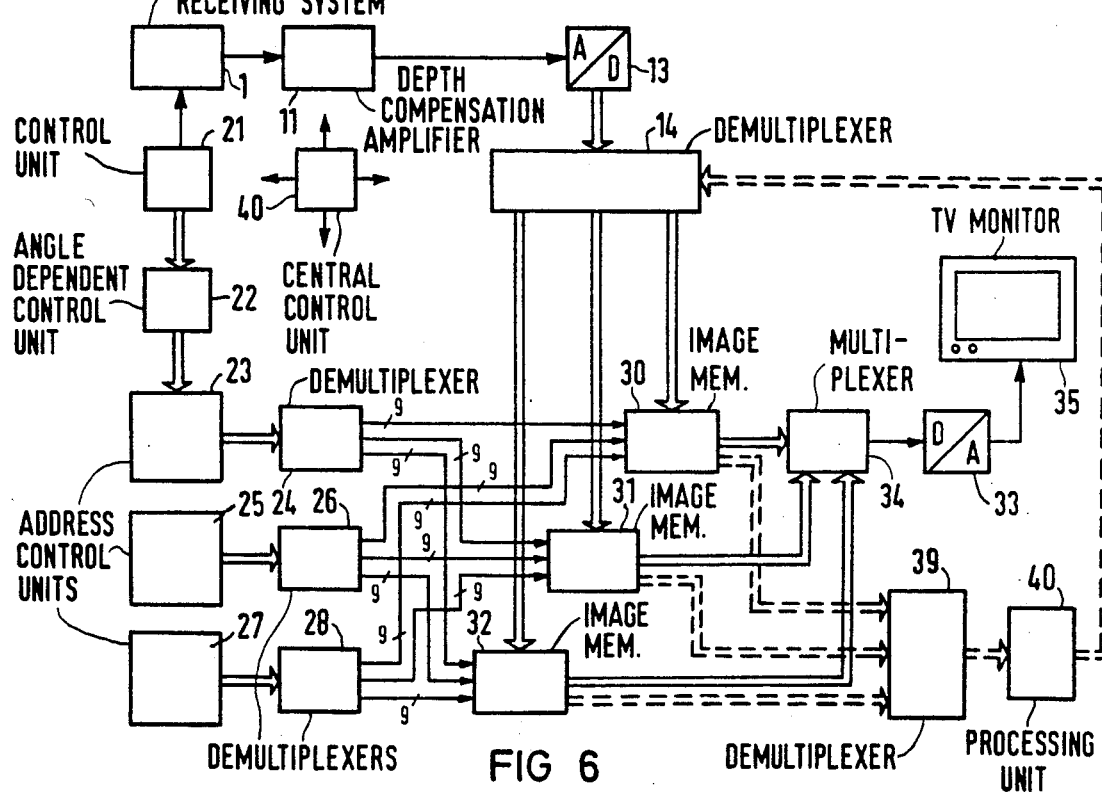
FIG. 6 is a block circuit diagram of a second embodiment of a scan converter operating in accordance with the principles of the method disclosed and claimed herein.

Further details of the apparatus shown in FIG. 4 are illustrated in FIGS. 5 and 6, with elements corresponding to those in FIG. 4 bearing the same reference numerals.

In FIGS. 5 and 6, the ultrasonic transmitting and receiving system (which may be a mechanically movable sector sonic head or a linear arrangement of ultrasonic transducers in a phase array) is activated by a control unit 21. The ultrasonic echo signals arriving in polar coordinates are supplied to a depth compensation amplifier or intensifier 11 and from there are supplied through an analog-to-digital converter 13 to a demultiplexer 14. The signals are supplied from the demultiplexer 14 to a digital image memory system. The complete apparatus is operated by a central control unit schematically represented at 40.

In FIG. 5, the digital image memory system consists of two complete two-dimensional image memories 30 and 31 each of which has a cartesian matrix memory. The two image memories 30 and 31 operate according to the alternating buffer principle, that is, a write-in operation is conducted with respect to one memory while a read-out operation is simultaneously conducted with respect to the other image memory. The data obtained from the image memories 30 and 31 is supplied via a multiplexer 34 and a digital-to-analog converter 33 to a television monitor 35.

In the embodiment shown in FIG. 6, the memory system consists of three complete image memories 30, 31 and 32. These three image memories 30, 31 and 32 also operate according to the alternating buffer principle, whereby the function of the individual image memories rotates cyclically. This means that one image memory is being inscribed with information while another image memory is being simultaneously read out, and the contents of the remaining image memory is simultaneously being subjected to image processing. Such processing is indicated in dashed lines leading to a demultiplexer 39 and a processing unit 40 for receiving the output of the demultiplexer 39. The processed data may, for example, be again written into the same image memory from which it was removed. This is indicated by the dashed output of the processing unit 40 leading back to the first demultiplexer 14. The demultiplexer 14 organizes the signal transmission to the "correct" image memory.

It is also possible to utilize more than three image memories without departing from the scope of the inventive method and apparatus disclosed and claimed herein, whereby the theory of cyclic alternating operation remains the same. For the alternating inscription and reading out, and possible image processing) of the data acquired from the scan, address control units 23, 25 (and, if needed, 27) are present. Each address control unit 23, 25 and 27 has a respective demultiplexer 24, 26 or 28 connected thereto for receiving the output of the respective control units. The demultiplexers 24, 26 and 28 respectively effect a distribution of the addresses according to the operating states (write-in, read-out, image processing) of the image memories 30, 31 and 32.

An angle dependent control unit 22 is additionally connected to the control unit 21 for angle-dependent control of the write-in address control unit 23. The data are thus converted to angle-independent information of predetermined functional dependency. This dependency may, for example, be given by the function $1/\cos \alpha$, whereby $2\alpha$ is the entire sector angle, as shown in FIG. 3. A data reduction is effected by means of this conversion.

Figure 7:
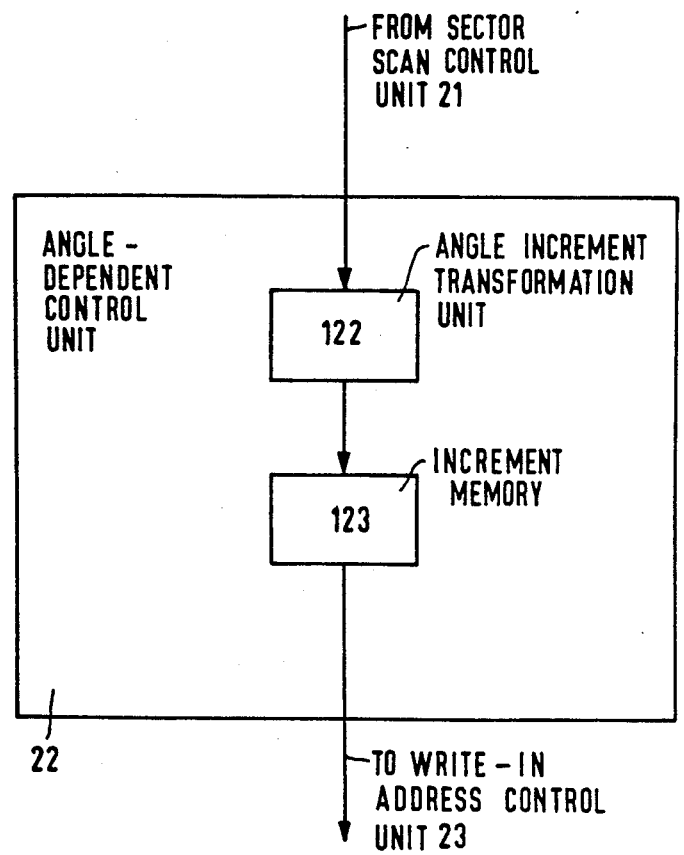
FIG. 7 is a block circuit diagram of an angle-dependent control unit.

A preferred embodiment of the angle-dependent control unit 22 is depicted in FIG. 7. During the sequential transfer of data into the matrix of any of the memories 30, 31, 32, the write-in address of the address control unit 23 will be incremented in each instance. The value of the increment is determined in dependence of the angle "$\alpha$" according to the following equation, wherein the word "pixel" ("picture element") stands for "memory element":

$$\Delta = 1/\cos \alpha \text{ [pixel] for } 0° \leq |\alpha| \leq 45°;$$
$$135° \leq |\alpha| \leq 180°$$

$$\Delta = 1/\sin \alpha \text{ [pixel] for } 45° \leq |\alpha| \leq 135°$$

The angle information is derived from the sector scan control unit 21 and fed into a unit 122 is followed by a memory 123 for intermediate storage of the increments $\Delta$. The memory for the increments $\Delta$ is connected to the write-in address control unit 23. Thus, via the write-in address control unit 23, the angle information is correlated with the data. Thus, the angle information is taken care of during transfer of the data into the image memory 30, 31, or 32.

In both FIGS. 5 and 6, the unit 22 directly controls the address control unit 23 for the write in of data, that is, the data are here geometrically correctly written into one of the image memories 30, 31 or 32.

As described above, in FIG. 6 and image processing or data manipulation may be undertaken on the contents of an image memory which is not being inscribed with data nor having data read therefrom. The ultrasonic echo signals contained in this particular image memory may therefore be two-dimensionally filtered. In the embodiment of FIG. 5, data manipulation can be conducted by means of the address control unit 27 during readout.

As described above, the method and apparatus disclosed and claimed herein require at least two complete image memories. Such image memories must operate at a high speed and have a sufficiently large memory capacity. Because such rapid memory modules of sufficiently high capacity are currently available, the solution to the problems in the art achieved by the method and apparatus disclosed and claimed herein is realizable with economically justifiable outlay. In particular, earlier solutions to the problem employing a vector memory, and image memory, and a horizontal memory were necessary. The method and apparatus disclosed and claimed herein considerably simplify conventional methods and devices while reducing the total outlay. Moreover, the method and apparatus disclosed and claimed herein offer the possibility of comprehensive image processing because the image content is comprised only of a single acquired image. As a result, and by avoiding the undesired sickle-shaped separation line in the case of a sector scan, the quality of the resulting image display is considerably increased.

Although modifications and changes may be suggested by those skilled in the art it is the intention of the inventors to embody within the patent warranted hereon all changes and modifications as reasonably and properly come within the scope of their contribution to the art.

I claim as my invention:

1. A method for representing in real-time ultrasonic echo signals sequentially arriving in polar coordinates obtained by a sector scan technique, each of selected pluralities of said ultrasonic echo signals corresponding to an ultrasonic echo image comprising the steps of:
   geometrically correctly alternatingly entering said ultrasonic echo images in at least two two-dimensional image memories for intermediate storage therein, each said intermediate memory accepting and storing a complete ultrasonic echo image;
   reading out a previously-stored complete ultrasonic echo image from one of said image memories in a manner conforming to television standards simultaneously as another ultrasonic echo image is being entered in another of said image memories; and
   displaying the read out ultrasonic echo image on a television display means.

2. A method for representing ultrasonic echo signals as claimed in claim 1 wherein the number of said image memories is at least three comprising the additional step of:
   simultaneously retaining the ultrasonic echo image stored in the remaining image memories, for which information is not currently being entered or read out, and for later recall, the steps of entering information and reading out information being conducted cyclicly from image memory to image memory.

3. A method for representing ultrasonic echo signals as claimed in claim 1 wherein the number of said image memories is at least three, comprising the additional step of:
   simultaneously subjecting the ultrasonic echo image stored in remaining image memories, for which information is not currently being entered or read out, to data processing, the steps of entering information, reading out information and processing of information proceeding cyclicly from image memory to image memory.

4. A method for representing ultrasonic echo signals as claimed in claim 3 wherein the step of processing said information in said remaining memories is further defined by filtering the ultrasonic echo images in said remaining image memories in a two-dimensional manner.

5. An apparatus for representing in real-time ultrasonic echo signals sequentially arriving in the form of polar coordinates obtained from a sector scan technique, each of selected pluralities of said ultrasonic echo signals corresponding to an ultrasonic echo image, comprising:
   an ultrasonic transmitting and receiving system for undertaking said sector scan;
   an analog-to-digital converter connected for receiving said ultrasonic signals from said system;
   at least two two-dimensional image memories, each dimensioned for accepting and for geometrically correctly storing a complete ultrasonic echo image;
   a demultiplexer means interconnected between said analog-to-digital converter and said image memories for alternatingly supplying said selected pluralities of said ultrasonic echo signals thereto, such that an ultrasonic image is stored in each memory;
   a display means;
   a multiplexer and a digital-to-analog converter interconnected in sequence between said image memories and said display means for transmitting information from said image memories to said display means in a manner conforming to television standards; and
   a control means including plurality of address control units respectively connected to each of said image memories for controlling entry and readout of information therefrom such that said ultrasonic echo signals are simultaneously entered into and read from different image memories for a duration conforming to a complete ultrasonic echo image.

6. An apparatus for representing ultrasonic echo signals as claimed in claim 5 further comprising:
   a control unit for said ultrasonic transmitting and receiving system; and
   an angle dependent control unit interconnected between said control unit for said ultrasonic transmitting and receiving system and one of said address control units for converting the data contained in said polar coordinates into information which is dependent upon the sector scan angle.

7. An apparatus for representing ultrasonic echo signals as claimed in claim 5 having at least three of said image memories, and further comprising:
   a data processing means connected to the outputs of each of said image memories, said data processing means including said control means for simultaneously entering said ultrasonic echo signals in a first of said memories, storing the ultrasonic echo signals in a second of said memories subjected to processing by said processing means, and reading the contents of a third of said memories, said entering, storing and reading being done in cyclical fashion from image memory to image memory.

8. An apparatus as claimed in claim 7 wherein said plurality of address control units comprise a first address control unit for controlling entry of said ultrasonic echo signals into said image memories, a second address control unit for controlling read out of said ultrasonic echo signals from said image memories, and a third address control unit for controlling processing of said ultrasonic echo signals stored in said image memories, and further comprising:
   three demultiplexers respectively interconnected between each of said address control units and said image memories; and
   a further demultiplexer interconnected between the outputs of each of said image memories and said processing means.

9. An apparatus for representing ultrasonic echo signals as claimed in claim 8 wherein the output of said processing means is connected to said demultiplexer which is interconnected between said analog-to-digital converter and said image memories for feeding back the data processed by said processing means for re-entry into one of said image memories.

* * * * *